(12) United States Patent
Daudelin

(10) Patent No.: US 6,574,770 B1
(45) Date of Patent: Jun. 3, 2003

(54) ERROR-CORRECTING COMMUNICATION METHOD FOR TRANSMITTING DATA PACKETS IN A NETWORK COMMUNICATION SYSTEM

(75) Inventor: Douglas Streeter Daudelin, Lincoln Park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 400 days.

(21) Appl. No.: 09/606,347

(22) Filed: Jun. 29, 2000

(51) Int. Cl.[7] .................... H03M 13/00; H04L 1/18
(52) U.S. Cl. .................. 714/776; 714/748; 370/392; 370/394; 709/232
(58) Field of Search ................. 714/776, 748, 714/749; 370/362, 395, 401, 466, 392, 404, 471, 474, 394, 428; 375/231, 241, 371; 709/232, 237

(56) References Cited

U.S. PATENT DOCUMENTS

| | | | | |
|---|---|---|---|---|
| 4,058,672 A | * | 11/1977 | Crager et al. | 370/394 |
| 5,526,353 A | * | 6/1996 | Henley et al. | 370/392 |
| 6,047,002 A | * | 4/2000 | Hartmann et al. | 370/466 |

* cited by examiner

Primary Examiner—Emmanuel L. Moise

(57) ABSTRACT

In the method, each transmitting endpoint separates its traffic to be transmitted into distinct queues. The packet at the head of one queue is transmitted, and no other packet is transmitted until a transmit complete signal (TCS) is generated. When a packet is received without error and accepted by a destination endpoint, the destination endpoint returns an acknowledgment indicating successful reception. The TCS is generated at the transmitting endpoint when the receiver acknowledgment should have been received. When the TCS is processed by the transmitting endpoint, if a receiver acknowledgment has been received, the packet previously sent is removed from the head of its queue. Otherwise, the packet is left at the head of its queue, the queue is placed in a "pending retry" state, and a timer is started. When the timer expires, queues are moved out of the "pending retry" state, enabling their packets to be transmitted again.

42 Claims, 2 Drawing Sheets

ERROR-CORRECTING COMMUNICATION METHOD FOR TRANSMITTING DATA PACKETS IN A NETWORK COMMUNICATION SYSTEM

BACKGROUND OF THE INVENTION

1. Field of the Invention

The present invention relates generally to network communication systems and associated communication protocols, and more particularly to an error-correcting communication method for transmitting data packets in a network communication system.

2. Description of the Prior Art

In network communication systems having a plurality of communicating endpoints, i.e., devices or units connected to a bus, such as the IEEE Standard 1394 High Performance Serial Bus, or devices or units connected via other transmission media besides a bus, data can be corrupted during the transmission, or be sent to an endpoint which is busy because its processing speed is slower than the transmitting endpoint or because it is simultaneously processing transmissions from other endpoints. The provisions in prior art error-correcting communication protocols to recover from these events require significant complexity in their implementation, as well as additional processing overhead (in processor cycles) in the handling of every communicated packet (even though most of the packets are communicated without a problem). The additional burden to support the complexity and processing overhead adds to the expense of implementing, and limits the throughput of, the network communication system.

Prior art error-correcting communications protocols, such as Link Access Procedure on the D-channel (LAPD), typically require the receiving endpoint to separately acknowledge each received packet. Because the transmitted packet may be lost (e.g., corrupted) during transmission, the transmitting endpoint is required to maintain a retransmission timer for previously transmitted but unacknowledged packets on each supported logical link. The expiration of the timer stimulates special recovery procedures, such as querying the receiver for the last good packet received, and in the end results in retransmitting the corrupted packet(s). The retransmission intervals are usually on the order of 100s of milliseconds, because processing latencies at the receiver, and, perhaps, also transmission latencies, may legitimately delay receiver acknowledgments. Because of the significant delay which may be incurred in receiving an acknowledgment to a transmitted packet, "window mechanisms" are employed to enable the transmitter to have some number of outstanding transmitted packets which have not yet been acknowledged.

"Busy conditions" at the receiver are typically handled by explicit notification to a transmitting endpoint when the busy condition exists and when it is exited (which itself adds to the processing load on the busy receiver). This is necessary because using the normal retransmission intervals to recover from busy conditions would result in unacceptable delays in getting new packets to the receiver. Both the error recovery and busy recovery procedures described above must work in the presence of errors themselves (e.g., a receiver acknowledgment or indication that a busy condition has cleared could become corrupted).

Further, communications to recover from errors or busy conditions in one direction of communication between two endpoints, may be hindered by busy or overloaded conditions in the other direction of communication between those same two endpoints. Due to the complexity of implementing these protocols, and because of the need to maintain the per-link state information (e.g., retransmission timers and transmit windows) for a large number of links, these protocols are typically implemented in software. In a typical multi-tasking, pre-emptive operating system, the protocol processing for each error-free packet may involve two or more context switches, as well as the work to start and stop a software timer. When it is desired to handle large volumes of traffic, just the processor overhead of these operating system actions themselves can be significant. The software development of these complex protocols is also error prone, and the development cost significant. It is not unusual for products including them to suffer one or more hard-to-find "bugs" in the communication protocol after it has been deployed in a product.

Accordingly, there exists a need for an error-correcting communications protocol which improves communication system performance and efficiency in the transmission of packets between independent, inter-communicating endpoints. Further, there exists a need for a simpler error-correcting protocol, and one that can be cheaply implemented in hardware, enabling high performance yet cost-effective network communication systems.

SUMMARY OF THE INVENTION

The present invention provides an error-correcting communication protocol implemented within a network communication system connecting a plurality of endpoints, i.e., devices or units, e.g., servers and terminals, via at least one transmission medium. In the protocol, each transmitting endpoint separates its traffic, e.g., data packets, to be transmitted into distinct queues. The packet at the head of one queue is transmitted, and no other packet is transmitted until a transmit complete signal is generated. A transmission is termed "incomplete" until the transmit complete signal is serviced. There is only one incomplete transmission from a given transmitting endpoint at any time.

When a packet is received without error and accepted by the receiving or destination endpoint, the receiving endpoint immediately returns an acknowledgment indicating successful reception to the transmitting endpoint. The transmit complete signal is generated at the transmitting endpoint at a time when any receiver acknowledgment should have been received by the transmitting endpoint.

When the transmit complete signal is processed by the transmitting endpoint (in hardware or in a software transmit complete interrupt service routine), if a receiver acknowledgment indicating successful reception has been received, the packet previously sent is removed from the head of its queue. Otherwise, the packet is left at the head of its queue, the queue is placed in a "pending retry" state, and a short, "pending retry" timer, preferably, a hardware timer, is started (unless the pending retry timer has been started because of a pending retry for another queue). In either event, another packet is transmitted from the head of a queue not in the pending retry state, if there is any.

When the pending retry timer expires, a hardware process or a software transmit complete interrupt service routine, moves all queues associated with the pending retry timer out of the pending retry state, enabling their packets to be transmitted again. Accordingly, the first packet to be transmitted from each of those queues will be retransmissions. An incrementing sequence number consisting of at least one bit is used for all transmissions from the same queue, and checked by the receiving endpoint, so that duplicate packets, e.g., packets which were erroneously retransmitted because of lost receiver acknowledgments, may be discarded by the receiving endpoint.

BRIEF DESCRIPTION OF THE DRAWINGS

Various preferred embodiments are described herein with references to the drawings.

DETAILED DESCRIPTION OF THE PREFERRED EMBODIMENTS

Figure 1A:
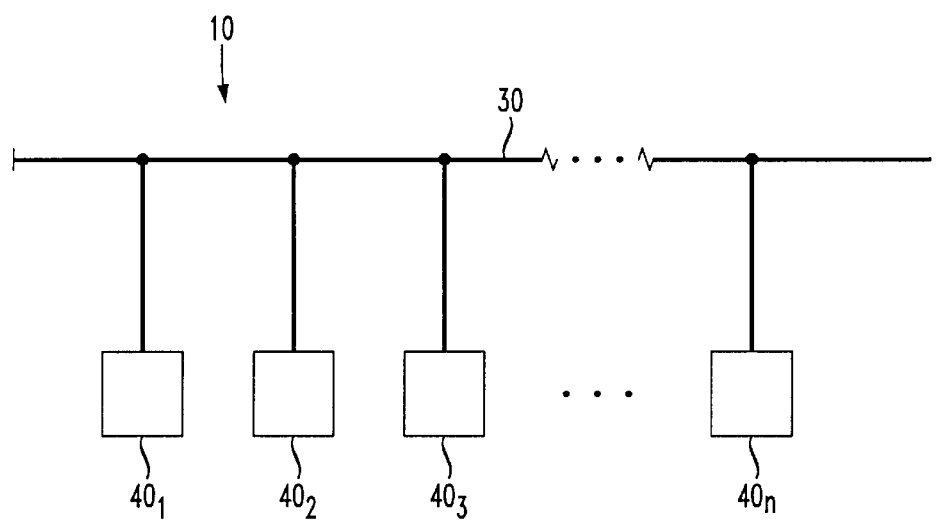
FIGS. 1A and 1B illustrate exemplary network communication systems for implementing an error-correcting communication protocol according to the present invention.
Figure 1B:
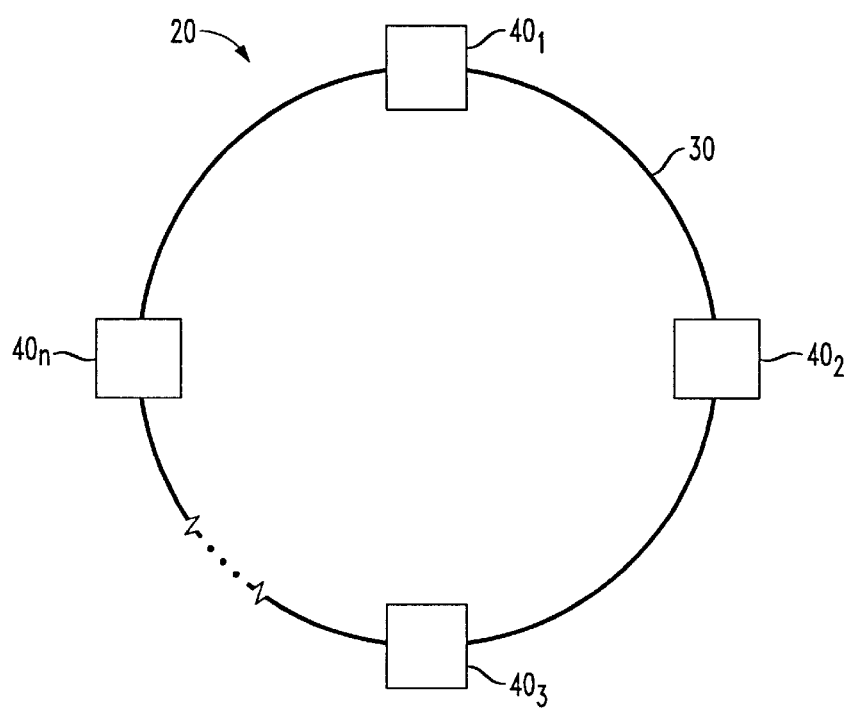

Referring now in detail to the drawings, in which like reference numerals represent similar or identical elements throughout the several views, and with particular reference to FIGS. 1A and 1B, there are shown exemplary network communication systems for implementing an error-correcting communication protocol according to the present invention. FIG. 1A illustrates a local bus network designated by reference numeral 10 and FIG. 1B illustrates a local ring network designated by reference numeral 20. Each network 10, 20 includes a transmission medium 30 connecting a plurality of endpoints $40_1$–$40_n$, i.e., devices or units, e.g., servers and terminals.

The transmission medium 30 preferably includes a physical layer protocol which requires each transmission from a transmitting endpoint, e.g., $40_1$, connected to the transmission medium 30 to be immediately acknowledged by a receiving endpoint 40, e.g., $40_n$. The physical layer protocol preferably further entails that when the transmitting endpoint $40_1$ generates a transmit complete interrupt signal, the signal also provides an indication of whether or not the receiving endpoint $40_n$ acknowledgment was received, and if so whether the acknowledgment indicated successful reception or a failure due to a busy condition or some other problem.

In the exemplary network communication system shown in FIG. 1A, the protocols operating over the physical (PHY) and link layers on transmission media 30 are preferably those specified in the IEEE 1394 Standard for a High Performance Serial Bus. In FIG. 1B, the protocols operating over the PHY and media access control (MAC) layers are preferably those specified in the ANSI/ATA Standard 878.1 for a Local Area Network Token Bus.

In the exemplary embodiment, both the IEEE 1394 and ANSI/ATA 878.1 protocols provide for, and commercial hardware is available which implements, the aspects of the present invention which require the receiver to immediately acknowledge successful reception of a transmitted packet, and an indication to be given of whether such an acknowledgment was received by the transmitter at the generation of the transmit complete signal. Preferably, the transmit complete signal generates a transmit complete interrupt signal to the software. Further, preferably, the transmit complete interrupt signal is designed such that it is guaranteed to occur, by one of various techniques known to those skilled in the art. For example, if the normal mechanism which generates the signal were to fail, then another, "watch dog" circuit would generate the signal after some short delay from the time the signal should have been generated.

Figure 2:
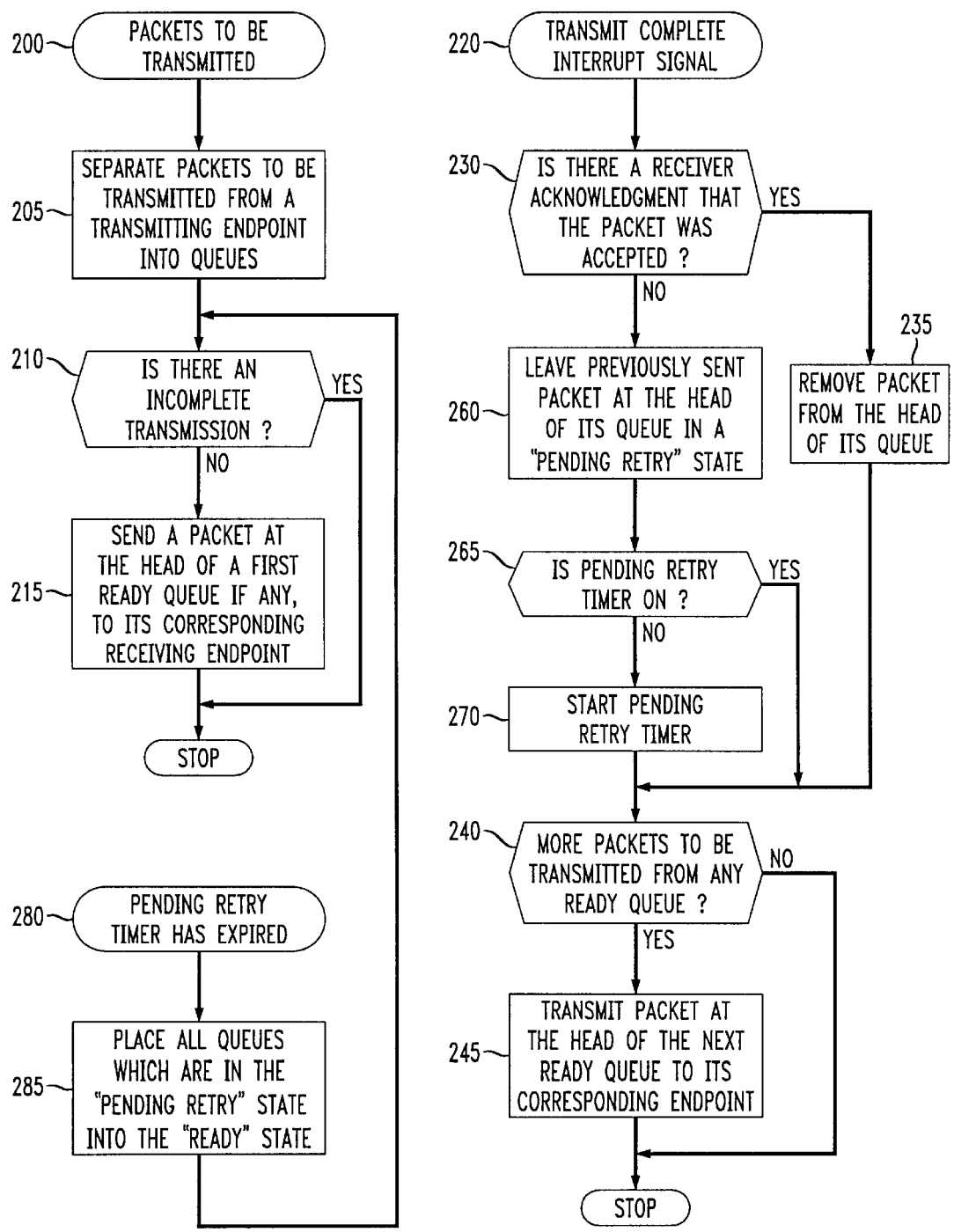
FIG. 2 depicts a flow chart illustrating the error-correcting communication protocol according to the present invention.

With reference to FIG. 2, there is shown a flow chart of the error-correcting communication protocol of the present invention. At the occurrence of the event that there are packets to be transmitted from a transmitting endpoint $40_1$ at step 200, the packets are separated into a plurality of queues at step 205, one queue for each destination endpoint, where, preferably, all higher-level logical links to the same endpoint share the same queue. When traffic is placed in a previously empty queue, the queue goes from an "empty" state to a "ready" state.

There is only one incomplete transmission at a time (a transmission is termed "incomplete" until the transmit complete signal for that transmission is serviced), and the "ready" queues are preferably serviced in a round-robin fashion. Hence, at step 210, the protocol checks to determine if there is an incomplete transmission. If no, then at step 215 the packet at the head of a first "ready" queue, if any, is sent to its corresponding receiving or destination endpoint $40_n$, and no other packet is transmitted until a transmit complete interrupt signal is serviced by the transmitting endpoint $40_1$ at step 220. If yes, then the protocol skips step 215 and terminates.

It is contemplated that the protocol of the present invention may be implemented such that more than one queue may simultaneously have an incomplete transmission. Accordingly, the check at step 210 of FIG. 2 could be modified to determine whether there is an incomplete transmission on every ready queue. If no, then at step 215, a packet at the head of at least one ready queue with no incomplete transmission would be sent. Accordingly, also, the transmit complete signal could indicate for which queue the transmit complete signal was generated.

At the occurrence of the event that there is a transmit complete interrupt signal at the transmitting endpoint $40_1$ at step 220, the transmit complete interrupt service routine determines whether a receiver acknowledgment indicating successful reception has been received at step 230. If yes, then the process proceeds to step 235. At step 235, the previously sent packet is removed from the head of its queue.

If it is determined that the receiver acknowledgment indicating successful reception has not been received, e.g., the receiving endpoint $40_n$ was busy, the receiver acknowledgment itself was corrupted, or the packet was detected by the receiver to have been received corrupted, the previously sent packet is left at the head of its queue in a "pending retry" state at step 260, and the pending retry timer is checked to determine if it is on at step 265. If the pending retry timer is not on, then the pending retry timer is started at step 270, and then the protocol proceeds to step 240. If it is on, because it was previously started because of a pending retry for another queue, then the protocol proceeds to step 240. In the case of no errors or busy conditions at the receiving endpoint $40_n$, the corresponding transmit queue never goes to a pending retry state. Mechanisms for detecting that a received packet has been received corrupted are well known to those skilled in the art, e.g., inclusion of a cyclic redundancy check (CRC).

At step 240, it is determined whether there are one or more additional packets to be transmitted by the transmitting endpoint $40_1$ from any queue in the ready state to a corresponding receiving endpoint. If the answer is yes, then the packet at the head of the next "ready" queue is sent at step 245. If there are no more packets to be transmitted, the protocol terminates.

When the event of the pending retry timer expiring occurs at step 280, all queues which are in the "pending retry" state are placed into the "ready" state at step 285. The protocol then proceeds to step 210.

In the case of no errors or busy conditions at a receiving endpoint, a corresponding pending retry timer is never set by the error-correcting communication protocol of the present invention, and any transmit queue sending to that endpoint never goes to a pending retry state. In the pending retry state, the pending retry timer delays retransmissions so that they are more likely to succeed, as well as limits the rate of retransmissions to prevent placing an unnecessary burden on the processor and transmission media in situations where continual retransmissions are necessary. It prevents a problem with transmissions from one queue from significantly affecting transmissions from other queues. It is set to a value short enough that recovery from all types of errors is performed in a timely manner. Therefore, all error conditions (e.g., corrupted packets, busy conditions, and corrupted acknowledgments) are handled by the protocol of the present invention.

The pending retry timer is beneficially set to 100s of usecs, to permit the following: 1) short enough that errors or busy conditions will not significantly slow down throughput to a given endpoint; 2) long enough for a busy endpoint to execute its receive interrupt service routine to make room for another packet in the buffer; 3) short enough to enable the transmitting endpoint to keep the receiving endpoint as busy receiving traffic as it is able to handle traffic; 4) long enough to prevent the transmitting endpoint from spending a burdensome percentage of processor cycles on retransmission in the situation where it is continually retransmitting traffic to receiving endpoint(s) which will always fail (e.g., the endpoint is not present, or is re-booting).

According to a preferred embodiment of the present invention, each packet from a queue is sent with a sequence number, beneficially implemented as a single bit which toggles with each new packet sent. The receiving endpoint $40_n$ keeps track of the next-expected sequence number from each transmitting endpoint, so that it may discard packets which were incorrectly re-sent (e.g., because of a corrupted acknowledgment).

Accordingly, there is provided to the receiver in the received packet an indication of the identity of the transmitting endpoint by means of one of various techniques, e.g., "source address," examples of which are provided by the exemplary IEEE 1394 and ANSI/ATA 878.1 protocols. This indication of the identity of the transmitting endpoint may also be necessary in order for the receiving endpoint to send the acknowledgment packet to the transmitting endpoint. It should be noted that the error-correcting communication protocol of the present invention requires that a successfully received packet be acknowledged regardless of whether it is subsequently discarded as a duplicate.

It is contemplated that the sequence number may consist of more than one-bit. In such a case, a mechanism is preferably provided for synchronizing the sequence number transmitted by a transmitting endpoint with that expected by the receiving endpoint. Such mechanisms are apparent to those skilled in the art, such as 1) transmission of a "RESET" or "RESTART Sequence Number" packet, 2) always accepting a packet with a sequence number of "0" and resetting the next expected sequence number to "1", and/or 3) accepting the next transmitted sequence number after some consecutive number of in-sequence, but unexpected, sequence numbers have been received and their packets rejected. It is, however, contemplated that transmitted packets may be identified to the receiving endpoint for the purpose of discarding duplicates by some means other than a sequence number.

Even though packet transmission using an error-correcting communication protocol is guaranteed, because there may be a number of intervening layers of software between the point where packet transmission is guaranteed, and the higher layers of software where the packets are used, it is possible that an interchange between two higher layers of software residing on different endpoints and using an error-correcting communication protocol may still experience errors (e.g., due to processes being re-started, buffer conditions, and/or software defects). However, where the underlying communication mechanism is reliable, simple, low-overhead methods are often used at the higher layers to check the integrity of an interchange. Such a method may include the numbering of packets exchanged at the high level. Therefore, it is contemplated that the function of numbering packets and discarding duplicate packets may not be handled at the level at which this protocol is implemented at all, but may be handled at a higher link level, or even at an application level.

It is contemplated that "ready" queues may be serviced in other than a round-robin fashion, e.g., to give transmissions from one queue preferential treatment over those from another queue.

It is also contemplated that mechanisms other than the described pending retry timer may be provided to delay retransmissions and limit their rate, e.g., a pending retry timer could routinely expire periodically, at which time all queues, if any, in the pending retry state could be placed in the ready state.

It is further contemplated that there may be more than one pending retry timer, where one or more queues may share a dedicated pending retry timer(s), to permit independent initiations of retransmissions between queues, or to give retransmissions from some queue(s) higher priority than those from other(s) by virtue of a shorter timeout interval for some pending retry timer(s) than other(s).

It is also contemplated that there may be two different pending retry timers: a pending retry error timer and a pending retry busy timer. The pending retry busy timer is started when a receiver acknowledgment has been received indicating a receiving endpoint busy condition. Also, the corresponding queue is placed in a pending retry busy state. In all other cases, where a receiver acknowledgment indicating successful reception is not received, the pending retry error timer is started and the corresponding queue is placed in a pending retry error state.

It is contemplated that upon processing the transmit complete signal where no receiver acknowledgment indicating successful reception has been received by the transmitting endpoint, from one to a limited number of immediate retries, i.e., retransmissions, could be performed before placing the queue in the pending retry state and starting the pending retry timer. Such an action could be accomplished at step 260 in FIG. 2 either directly, by retransmitting the packet at step 260, or indirectly, by leaving the packet at the head of its queue and also leaving the queue in the ready state at step 260. Should the limited number of immediate retries be attempted without a successfully acknowledged transmission, then step 260 would take the action indicated in FIG. 2, i.e., placing the queue in the pending retry state. It is further contemplated that such an immediate retransmit may be performed conditionally upon the type of acknowledgment or lack thereof received by the transmitting endpoint, e.g., an acknowledgment indicating a receiving endpoint busy condition may not invoke an immediate retry.

It is further contemplated that packets to be transmitted from a transmitting endpoint $40_t$ to a receiving endpoint $40_n$ at step 205, may be separated into multiple transmit queues, each queue having the single destination endpoint $40_n$. This may be done for the purpose of providing different treatment to different types of transmitted packets, or to those packets sent from different subsets of higher level links. In such a case, where this level of the protocol is responsible for eliminating duplicate packets, the receiver would maintain an expected sequence number for each queue on a transmitting endpoint from which it can receive packets. Also, for the purpose of correlating received sequence number to expected sequence number, there would be provided at the receiver an indication not only of the identity of the transmitting endpoint, but also of the identity of the transmitting queue within the endpoint.

Flow control, or halting transmission for a time to an endpoint which is busy, is accomplished by placing a queue in a pending retry state when a receiver acknowledgment indicating successful reception is not received. It is contemplated that a special receiver acknowledgment may be returned, which indicates the reason the transmission was not successfully received. It is further contemplated that two such reasons indicated may be a busy condition at the receiver or detection that the transmitted packet was corrupted. It is further contemplated that two different timeout values may be programmed into a retry timer based on the reason a retry is necessary; a shorter value in the case of a corrupted transmission, and a longer value in the case of a busy endpoint.

It is further contemplated that, where more than one transmit queue are sharing a retry timer, that the timeout interval of that one retry timer could be changed from a longer value to a shorter value if one of those queues subsequently needs to retransmit based on a shorter time interval than that with which the timer was previously started. It is further contemplated that two transmit queues, each having the same destination endpoint $40_n$, may each be transmitting to two different queues on the destination endpoint, which queues may be in or out of the busy condition independent of the state of the other receiver queue. In such a case, there would be provided at the receiving endpoint $40n$ an indication of the queue to which the received packet should go by means of one of various techniques apparent to those skilled in the art, e.g., "a destination address." Also in such a case, the receiving endpoint $40_n$ would send, or not send, an acknowledgment to the transmitting endpoint $40_1$ based on the condition of the destination queue for the received packet.

It is contemplated that a retry counter may be associated with each queue at the transmitting endpoint. This counter could be incremented upon every retry from the queue and cleared whenever a successful transmission from the queue occurs. A recovery action could be initiated if the retry counter exceeds some predetermined threshold or number.

It is also contemplated that there may be more than one destination endpoint for transmissions from any queue, e.g., a broadcast queue. In such a case, the broadcast queue is put into the pending retry state and the pending retry timer is started whenever a receiver acknowledgment indicating successful reception is not received from a subset of the destination endpoints. The subset may include one destination endpoint, all of the destination endpoints, or some other subset of the destination endpoints. This operation provides for acknowledgment of broadcast packets.

In the case where the subset of destination endpoints for which successful acknowledgments must have been received consists of all addressed destination endpoints, the operation of the present invention provides for error-corrected transmission of broadcast packets. This feature is enabled by the aspects of the present invention which provide for silent discarding of duplicate packets, while following similar recovery procedures for all types of error conditions. For example, the protocol is able to recover from a broadcast packet transmission to three destination endpoints where one of the endpoints successfully received the packet, another endpoint received it corrupted, and the last endpoint was not able to receive the packet because of a busy condition.

It is further contemplated that where the hardware and/or physical layer of the transmission media do not provide for an immediate indication of a successful reception of the most recently transmitted packet, such an indication could be provided at a small cost in overhead and throughput so that the error-correcting communication protocol of the present invention may still be advantageously implemented. The protocol can be designed such that the receiving endpoint's interrupt service routine, which provides low-level processing of each received packet, sends an acknowledgment back to the transmitting endpoint of each received message. Upon the transmitting endpoint receiving such an acknowledgment, it generates a transmit complete interrupt signal. To recover from lost acknowledgments, the transmit process starts a hardware timer upon each data packet transmission to the receiving endpoint. The hardware timer similarly generates a transmit complete interrupt signal in the event it expires, because no prior-occurring receiver acknowledgment has been received.

It is still further contemplated to implement at least a portion of the error-correcting communication protocol of the present invention in hardware, rather than implementing the entire protocol of the present invention in software. It is contemplated that the protocol implemented in software includes programmable instructions processed by at least one processor residing within or external to the network communication system. It is also contemplated that the portion of the protocol implemented in software is implemented in interrupt service routines, which avoids processor overhead which would otherwise be incurred in operating system actions, such as operating system context switches.

The error-correcting communication protocol of the present invention is more efficient than prior art protocols, because it initiates error correction procedures (i.e., by starting a pending retry timer) only in the event something has gone wrong with a transmission. The low-latency retransmission/error correction provided by the protocol of the present invention, together with the aspect that continual retransmission does not consume a burdensome percent of processor cycles, enables all "error conditions", including the receiving endpoint being busy, to be handled by the same error correction mechanism. It also eliminates the need for windowing and "are you still there?" queries. Further, it avoids the long recoveries associated with missed or corrupted receiver acknowledgments which are typical of prior art protocols.

The error-correcting communication protocol of the present invention also enables the use of only one timer, or a smaller set of timers, to be used for all higher level communication links. The functionality required at the receiver to determine whether to send an acknowledgment is minimal; if the packet is observed to be error-free, and there is room to store it for later processing by higher level software, then an acknowledgment may be returned. The protocol of the present invention does this whether or not the packet will be discarded as a result of being determined to be a duplicate, or other higher level link status.

The above aspects of the protocol of the present invention make it easier to implement than prior art protocols, and also cost-effective to implement in hardware. It is contemplated that where the protocol is not completely implemented in hardware, the remainder can be implemented in software interrupt service routines in a manner very efficient of processor cycles.

Another benefit is that because the receiver acknowledgment is preferably handled by hardware at both the receiving and transmitting endpoints as one of the procedures associated with transmitting a packet, correction of errors in one direction of communication between two endpoints is unaffected by congestion, processor overload, flow control or busy conditions in the other direction of communication between two endpoints.

What has been described herein is merely illustrative of the application of the principles of the present invention. For example, the functions described above and implemented as the best mode for operating the present invention are for illustration purposes only. Other arrangements and methods may be implemented by those skilled in the art without departing from the scope and spirit of this invention.

What is claimed is:

1. A method for transmitting data packets in a network communication system connecting a plurality of endpoints via at least one transmission medium, where packets to be transmitted from a transmitting endpoint are separated into a plurality of queues, each of said plurality of queues having at least one corresponding destination endpoint of said plurality of endpoints to which its packets are to be transmitted, said method comprising the steps of:

transmitting, at any time, from said transmitting endpoint a packet from a head of a queue of a plurality of queues, but only if said queue is not in a pending retry state and has no incomplete transmissions, to said at least one corresponding destination endpoint of said queue; and servicing, at any time, at said transmitting endpoint, a transmit complete signal for said transmitted packet, by removing or leaving removed said transmitted packet from the head of said queue, if an acknowledgment was received from said at least one corresponding destination endpoint of said queue indicating that said packet was successfully received, otherwise placing said queue in the pending retry state, leaving said transmitted packet at or returning said transmitted packet to the head of said queue, and removing said queue from the pending retry state after a period of time has elapsed.

2. The method according to claim 1, further comprising the step of retransmitting said packet from said transmitting endpoint to said at least one corresponding destination endpoint of said queue whenever said acknowledgment has not been received at said servicing step up to a limited number of times, said step of retransmitting said packet up to said limited number of times being performed without placing said queue in the pending retry state.

3. The method according to claim 2, wherein said step of retransmitting is not performed for at least one particular type of unsuccessful transmission.

4. The method according to claim 1, further comprising the steps of:

maintaining a retry count for each queue of consecutive, unsuccessful retries from that queue; and initiating a recovery action if said retry count exceeds a predetermined number.

5. The method according to claim 1, wherein said packet is transmitted from the head of said queue only if there is no incomplete transmission from said transmitting endpoint to any of said at least one corresponding destination endpoint of said queue.

6. The method according to claim 1, wherein said packet is transmitted from the head of said queue only if there is no incomplete transmission from said transmitting endpoint.

7. The method according to claim 1, wherein said period of time is timed by a timer.

8. The method according to claim 7, wherein said timer expires periodically and independent of the time at which any queue of said plurality of queues is placed in the pending retry state.

9. The method according to claim 7, wherein said timer is started at a time when a transmit complete signal is serviced at said transmitting endpoint, if said timer is not already started.

10. The method according to claim 1, wherein said transmit complete signal does not occur until after said acknowledgment from said at least one corresponding destination endpoint should have been received by said transmitting endpoint.

11. The method according to claim 1, wherein said step of transmitting said packet comprises the steps of:

transmitting said packet to said at least one corresponding destination endpoint of said queue with an identifier;

keeping track at said at least one corresponding destination endpoint of said queue of a next-expected identifier from said queue; and discarding successfully received packets at said at least one corresponding destination endpoint of said queue which have a corresponding identifier which is not identical to said next-expected identifier.

12. The method according to claim 11, wherein said identifier is a number.

13. The method according to claim 11, wherein said identifier is a sequence number.

14. The method according to claim 13, wherein said sequence number is a single bit which toggles with each new packet transmitted to said at least one corresponding destination endpoint of said queue.

15. A method for transmitting data packets in a network communication system connecting at least three endpoints via at least one transmission medium, said method comprising the steps of:

a) separating packets to be transmitted from a transmitting endpoint into a plurality of queues, each of said plurality of queues having at least one corresponding destination endpoint of said at least three endpoints to which its packets are to be transmitted;

b) determining whether there is an incomplete transmission from said transmitting endpoint to any of said at least three endpoints;

c) transmitting a packet at the head of a queue of said plurality of queues to said at least one corresponding destination endpoint of said at least three endpoints, if there is no incomplete transmission from said transmitting endpoint to any of said at least three endpoints, otherwise proceeding to step (e);

d) sending, from said at least one corresponding destination endpoint of said plurality of endpoints upon successfully receiving said transmitted packet, an acknowledgment indicating that said packet was successfully received to said transmitting endpoint;

e) servicing at said transmitting endpoint a transmit complete signal after said signal has occurred, said signal does not occur until after said acknowledgment from said at least one corresponding destination endpoint should have been received by said transmitting endpoint;

e.1) determining whether said acknowledgment indicating that said packet was successfully received was received by said transmitting endpoint;

e.2) if not, then leaving said packet at or returning said packet to the head of said queue and placing said queue in a pending retry state, otherwise proceeding to step (f);

e.3) determining if a corresponding pending retry timer is on;

e.4) starting said corresponding pending retry timer if said corresponding pending retry timer is determined to be off; and e.5) proceeding to step (g);

f) removing said transmitted packet from or leaving removed said transmitted packet from the head of said queue;

g) determining if there is at least one more packet to be transmitted from any of said plurality of queues which are not in said pending retry state;

h) transmitting another packet at the head of said queue or other queue of said plurality of queues which is not in said pending retry state, if it is determined in step (g) that there is at least one more packet to be transmitted, and proceeding to step (d); and said method further comprises the step of:

servicing, at any time, an expired pending retry timer at said transmitting endpoint by removing each of said plurality of queues corresponding to said expired pending retry timer from said pending retry state and proceeding to step (b).

16. The method according to claim 15, wherein said method further comprises the steps of:

placing each of said plurality of queues from an empty state to a ready state when at least one packet is placed within each of said plurality of queues; and moving said plurality of queues from said pending retry state to said ready state upon expiration of said corresponding pending retry timer.

17. The method according to claim 15, wherein step (a) comprises the step of separating data packets into said plurality of queues such that all packets to be transmitted to the same destination endpoint of said at least three endpoints are placed in the same queue.

18. The method according to claim 17, wherein each of said plurality of queues has only one corresponding destination endpoint of said at least three endpoints.

19. The method according to claim 15, wherein each of said plurality of queues has only one corresponding destination endpoint of said at least three endpoints.

20. The method according to claim 15, wherein said corresponding pending retry timer is set to permit at least one of the following: 1) short enough that errors or busy conditions will not significantly slow down throughput to a given endpoint; 2) long enough for a busy endpoint to execute a software routine to make room for another packet in said busy endpoint's buffer; 3) short enough to enable said transmitting endpoint to keep said at least one corresponding destination endpoint as busy receiving packets as said transmitting endpoint is able to handle said packets; and 4) long enough to prevent said transmitting endpoint from spending a great percentage of processor cycles on continually retransmitting packets to said at least one corresponding destination endpoint where such transmissions continuously fail.

21. The method according to claim 15, wherein said corresponding pending retry timer includes a pending retry busy timer and a pending retry error timer.

22. The method according to claim 15, wherein said corresponding pending retry timer is used by each of said plurality of queues.

23. The method according to claim 15, further comprising the step of terminating the method if it is determined in step (g) that there is no at least one more packet to be transmitted.

24. The method according to claim 15, wherein said step (c) comprises the steps of:

transmitting said packet to all of said at least one corresponding destination endpoint of said at least three endpoints with an identifier;

keeping track at all of said at least one corresponding destination endpoint of said at least three endpoints of a next-expected identifier from all queues of said plurality of queues from each transmitting endpoint from which said at least one destination endpoint can receive packets; and discarding successfully received packets at all of said at least one corresponding destination endpoint which have a corresponding identifier which is not identical to said next-expected identifier.

25. The method according to claim 24, wherein said identifier is a number.

26. The method according to claim 24, wherein said identifier is a sequence number.

27. The method according to claim 26, wherein said sequence number is a single bit which toggles with each new packet transmitted to said at least one corresponding destination endpoint of said at least three endpoints.

28. The method according to claim 15, wherein said at least one transmission medium includes a physical or media access control layer protocol which requires each transmission from said transmitting endpoint of said at least three endpoints connected to said at least one transmission medium to be acknowledged by said at least one corresponding destination endpoint.

29. The method according to claim 28, wherein said at least one transmission medium is an IEEE Standard 1394 High Performance Serial Bus.

30. The method according to claim 28, wherein said at least one transmission medium is an ANSI/ATA 878.1 bus.

31. The method according to claim 15, wherein steps (c) and (h) comprise the step of servicing each queue of said plurality of queues with a different frequency and/or a different retransmit timeout interval of said corresponding pending retry timer than other queues.

32. The method according to claim 15, wherein said transmit complete signal is generated by hardware.

33. A network communication system comprising:

at least one processor for processing an error-correcting communication method; and a plurality of endpoints connected via at least one transmission medium, where packets to be transmitted from a transmitting endpoint are separated into a plurality of queues, each of said plurality of queues having at least one corresponding destination endpoint of said plurality of endpoints to which its packets are to be transmitted, where said error-correcting communication method comprises the steps of:

transmitting, at any time, from said transmitting endpoint a packet from the head of a queue of said plurality of queues, which is not in a pending retry state and has no incomplete transmissions, to said at least one corresponding destination endpoint of said queue;

sending to said transmitting endpoint from said at least one corresponding destination endpoint of said queue, upon successfully receiving said transmitted packet, an acknowledgment indicating that said packet was successfully received; and servicing, at any time, at said transmitting endpoint, a transmit complete signal for said transmitted packet, by removing or leaving removed said transmitted packet from the head of said queue, if said acknowledgment was received from said at least one corresponding destination endpoint of said queue, otherwise placing said queue in the pending retry state, leaving said transmitted packet at or returning said transmitted packet to the head of said queue, and removing said queue from the pending retry state after a period of time has elapsed.

34. The system according to claim 33, wherein said error-correcting communication method further comprises the step of retransmitting said packet from said transmitting endpoint to said at least one corresponding destination endpoint of said queue whenever said acknowledgment has not been received at said servicing step up to a limited number of times, said step of retransmitting said packet up to said limited number of timers being performed without placing said queue in the pending retry state.

35. The system according to claim 34, wherein said step of retransmitting is not performed for at least one particular type of unsuccessful transmission.

36. The system according to claim 33, wherein said error-correcting communication method further comprises the steps of:

maintaining a retry count for each queue of consecutive, unsuccessful retries from that queue; and initiating a recovery action if said retry count exceeds a predetermined number.

37. The system according to claim 33, wherein a packet is transmitted from the head of said queue if there is no incomplete transmission from said transmitting endpoint to any of said at least one corresponding destination endpoint of said queue.

38. The system according to claim 33, wherein a packet is transmitted from the head of said queue only if there is no incomplete transmission from said transmitting endpoint.

39. The system according to claim 33, wherein said transmit complete signal does not occur until after said acknowledgment from said at least one corresponding destination endpoint should have been received by said transmitting endpoint.

40. The system according to claim 33, wherein said step of transmitting said packet comprises the steps of:

transmitting said packet to all of said at least one corresponding destination endpoint of said queue with an identifier;

keeping track at all of said at least one corresponding destination endpoint of said queue of a next-expected identifier from said queue; and discarding successfully received packets at all of said at least one corresponding destination endpoint of said queue which have a corresponding identifier which is not identical to said next-expected identifier.

41. The system according to claim 33, wherein said at least one transmission medium includes a physical or media access control layer protocol which requires each transmission from said transmitting endpoint to be acknowledged by said at least one corresponding destination endpoint of said queue.

42. A network communication system comprising:

at least one processor for processing an error-correcting communication method; and at least three endpoints connected via at least one transmission medium, where said error-correcting communication method comprises the steps of:

a) separating packets to be transmitted from a transmitting endpoint into a plurality of queues, each of said plurality of queues having at least one corresponding destination endpoint of said at least three endpoints to which its packets are to be transmitted;

b) determining whether there is an incomplete transmission from said transmitting endpoint to any of said at least three endpoints;

c) transmitting a packet at the head of a queue of said plurality of queues to said at least one corresponding destination endpoint of said at least three endpoints, if there is no incomplete transmission from said transmitting endpoint to any of said at least three endpoints, otherwise proceeding to step (e);

d) sending, from said at least one corresponding destination endpoint of said plurality of endpoints upon successfully receiving said transmitted packet, an acknowledgment indicating that said packet was successfully received to said transmitting endpoint;

e) servicing at said transmitting endpoint a transmit complete signal after said signal has occurred, said signal does not occur until after said acknowledgment from said at least one corresponding destination endpoint should have been received by said transmitting endpoint;

e.1) determining whether said acknowledgment indicating that said packet was successfully received was received by said transmitting endpoint;

e.2) if not, then leaving said packet at or returning said packet to the head of said queue and placing it in a pending retry state, otherwise proceeding to step (f);

e.3) determining if a corresponding pending retry timer is on;

e.4) starting said corresponding pending retry timer if said corresponding pending retry timer is determined to be off; and e.5) proceeding to step (g);

f) removing said transmitted packet from or leaving removed said transmitted packet from the head of said queue;

g) determining if there is at least one more packet to be transmitted from any of said plurality of queues which are not in said pending retry state;

h) transmitting another packet at the head of said queue or other queue of said plurality of queues which is not in said pending retry state, if it is determined in step (g) that there is at least one more packet to be transmitted, and proceeding to step (d); and said method further comprises the step of:

servicing, at any time, an expired pending retry timer at said transmitting endpoint by removing each of said plurality of queues corresponding to said expired pending retry timer from said pending retry state and proceeding to step (b).

* * * * *